(12) United States Patent
Kim et al.

(10) Patent No.: US 12,179,773 B2
(45) Date of Patent: Dec. 31, 2024

(54) VIRTUAL SOUND PROVISION APPARATUS AND METHOD FOR ELECTRIC VEHICLES

(71) Applicants: Hyundai Motor Company, Seoul (KR); Kia Corporation, Seoul (KR)

(72) Inventors: Ki Chang Kim, Gyeonggi-do (KR); Jin Sung Lee, Gyeonggi-do (KR); Ji Won Oh, Gyeonggi-do (KR); Dong Chul Park, Gyeonggi-do (KR); Kyoung Jin Chang, Gyeonggi-do (KR); Tae Kun Yun, Gyeonggi-do (KR); Jeong Soo Eo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 253 days.

(21) Appl. No.: 17/745,351

(22) Filed: May 16, 2022

(65) Prior Publication Data
US 2023/0016272 A1 Jan. 19, 2023

(30) Foreign Application Priority Data
Jul. 14, 2021 (KR) ........................ 10-2021-0091974

(51) Int. Cl.
*B60W 40/09* (2012.01)
*B60W 50/10* (2012.01)
*B60W 50/14* (2020.01)

(52) U.S. Cl.
CPC ............ *B60W 40/09* (2013.01); *B60W 50/10* (2013.01); *B60W 50/14* (2013.01); *B60W 2510/082* (2013.01); *B60W 2510/085* (2013.01)

(58) Field of Classification Search
CPC ...... B60W 40/09; B60W 50/10; B60W 50/14; B60W 2510/082; B60W 2510/085;
(Continued)

(56) References Cited

U.S. PATENT DOCUMENTS

| 6,032,096 | A  | * | 2/2000 | Takahashi | ............. | B60W 10/04 477/121 |
| 2004/0023755 | A1 | * | 2/2004 | Nozaki | ................. | B60W 30/16 477/45 |

(Continued)

FOREIGN PATENT DOCUMENTS

| KR | 101926990 B1 | 12/2018 |
| KR | 101947317 B1 | 2/2019 |
| KR | 2019-0051451 A | 5/2019 |

*Primary Examiner* — Jason Holloway
*Assistant Examiner* — Madison B Emmett
(74) *Attorney, Agent, or Firm* — Fox Rothschild LLP

(57) ABSTRACT

A virtual sound provision apparatus for an electric vehicle includes a driving information detector configured to detect vehicle driving information for outputting a virtual driving sound, a microphone configured to detect an actual driving sound generated from the electric vehicle, a controller configured to determine a characteristic of a target sound based on an acceleration and deceleration driving pattern of a driver from an accelerator pedal input value and a brake pedal input value of the driver, and generating and outputting a sound control signal for outputting the virtual driving sound having the characteristic of the target sound based on the determined characteristic information of the target sound and characteristic information of the actual driving sound, and a sound device configured to output a virtual engine sound that simulates an engine sound from the electric vehicle at the time of acceleration and deceleration according to the sound control signal.

19 Claims, 7 Drawing Sheets

---

COLLECT DRIVING VARIABLE INFORMATION FOR VIRTUAL EFFECT PRODUCTION
- COLLECT PEDAL INPUT INFORMATION, DRIVING SYSTEM SPEED INFORMATION, ACTUAL DRIVING SOUND INFORMATION, AND OTHER NECESSARY INFORMATION (VEHICLE SPEED AND TORQUE)

↓

DETERMINE CHARACTERISTIC OF TARGET SOUND BASED ON DRIVING PATTERN OF DRIVER AT TIME OF ACCELERATION AND DECELERATION

↓

GENERATE SOUND CONTROL SIGNAL FOR OUTPUTTING VIRTUAL DRIVING SOUND COINCIDING WITH CHARACTERISTIC OF TARGET SOUND USING CHARACTERISTIC INFORMATION OF TARGET SOUND

↓

GENERATE AND OUTPUT VIRTUAL DRIVING SOUND ACCORDING TO SOUND CONTROL SIGNAL (USE SPEAKER)

(58) Field of Classification Search
CPC .... B60W 10/06; B60W 10/08; B60W 40/105; B60W 40/107; B60W 2510/083; B60W 2520/10; B60W 2540/10; B60W 2540/12; B60W 2540/30; B60L 2240/16; B60L 2240/423; B60L 2250/26; B60L 2270/00; B60L 15/20; B60Q 5/00; B60Q 5/005; B60Q 5/008; B60Q 9/00; G10K 15/04; B60Y 2200/91

See application file for complete search history.

(56) References Cited

U.S. PATENT DOCUMENTS

| | | | | |
|---|---|---|---|---|
| 2010/0145588 | A1* | 6/2010 | Reuschel | B60W 10/06 701/70 |
| 2016/0016513 | A1* | 1/2016 | Di Censo | B60Q 1/54 340/467 |
| 2016/0029119 | A1* | 1/2016 | Valeri | G10K 15/02 381/71.4 |
| 2017/0101087 | A1* | 4/2017 | Momose | B60W 40/11 |
| 2017/0123754 | A1* | 5/2017 | Kwon | G06F 3/165 |
| 2019/0266994 | A1* | 8/2019 | Inoue | G10K 11/1785 |
| 2020/0101896 | A1* | 4/2020 | Bastyr | B60Q 9/00 |
| 2021/0180966 | A1* | 6/2021 | Kuo | G01C 21/3461 |
| 2022/0234498 | A1* | 7/2022 | Maeda | G10K 15/02 |
| 2023/0016272 | A1* | 1/2023 | Kim | B60W 50/14 |

* cited by examiner

VIRTUAL SOUND PROVISION APPARATUS AND METHOD FOR ELECTRIC VEHICLES

CROSS-REFERENCE TO RELATED APPLICATION

This application claims under 35 U.S.C. § 119(a) the benefit of Korean Patent Application No. 10-2021-0091974 filed on Jul. 14, 2021, the entire contents of which are incorporated herein by reference.

BACKGROUND

(a) Technical Field

The present disclosure relates to a virtual sound provision apparatus and method for electric vehicles, more particularly, to the virtual sound provision apparatus and method for generating and playing a virtual driving sound in an electric vehicle.

(b) Description of the Related Art

As is generally known, an electric vehicle (EV) is a vehicle that is driven using a motor. A driving system of an electric vehicle includes a battery configured to supply power necessary to drive a motor, an inverter connected to the battery to drive and control the motor, the motor being connected to the battery via the inverter as a vehicle driving source in a chargeable and dischargeable manner, and a decelerator configured to reduce rotational force of the motor and to transmit the reduced rotational force to a driving wheel.

In particular, the inverter serves to convert direct current (DC) supplied from the battery into alternating current (AC) and to supply the AC to the motor via a power cable at a time of driving the motor, and serves to convert AC generated by the motor into DC and to supply the DC to the battery in order to charge the battery at a time of motor regeneration. An electric vehicle uses no multistage transmission, unlike a conventional internal combustion engine vehicle, and the decelerator, which uses a fixed gear ratio, is disposed between the motor and the driving wheel instead. The reason for this is that an internal combustion engine (ICE) has a wide energy efficiency distribution range depending on driving points and provides high torque only in a high-speed region, whereas the motor has a relatively small difference in efficiency with respect to driving points and is capable of implementing high torque at a low speed through only the characteristics of a single motor.

In addition, a vehicle equipped with a conventional internal combustion engine driving system requires a launch mechanism, such as a torque converter or a clutch, due to the characteristics of the internal combustion engine, which cannot be driven at a low speed, whereas the launch mechanism may be omitted from the driving system of the electric vehicle since the motor is capable of being easily driven at a low speed. Due to such a difference in mechanism, the electric vehicle may provide smooth drivability without discontinuity due to shifting, unlike the internal combustion engine vehicle.

As described above, the conventional internal combustion engine vehicle burns fuel to generate power, whereas the driving system of the electric vehicle drives the motor using electric power of the battery to generate power. Unlike torque of the internal combustion engine generated by aerodynamic and thermodynamic reactions, therefore, torque of the electric vehicle is generally more sophisticated, smoother, and more rapidly reactive than the torque of the internal combustion engine.

The above characteristics act as positive factors in the electric vehicle. For a high-performance vehicle, however, various effects generated by noise, physical vibration, and thermodynamic action of the internal combustion engine may be deemed important based on emotional reactions of vehicle occupants. For example, a feature that cannot be provided by the electric vehicle due to the characteristics of the driving system is an after-burn sound, which may be frequently felt in a high-performance internal combustion engine vehicle, and an engine sound differently generated depending on an acceleration and deceleration state of the vehicle.

The after-burn sound is a sound generated due to a change in pressure at an exhaust system of the internal combustion engine. In a high-performance vehicle, when rich fuel is discharged through an exhaust manifold in the state of being burnt in a cylinder of the engine for various reasons, the fuel expands in a high-temperature exhaust pipe, whereby the after-burn sound is generated. The after-burn sound enables a vehicle occupant, including a driver, to feel a dynamic driving sensation and dynamic realism.

With the recent increase in use of electric vehicles, the number of drivers who wish to feel a driving sensation, dynamic realism, sound, and driving fun even in the electric vehicles, like the internal combustion engine vehicle, may have increased. Accordingly, technology capable of generating and providing a virtual driving sound that simulates a sound generated from a driving system other than the driving system of the electric vehicle, such as the engine sound or the after-burn sound, as in the internal combustion engine vehicle, would be desirable for the electric vehicle. In particular, technology capable of providing a virtual acceleration and deceleration sound differentiated depending on an acceleration and deceleration driving pattern of the driver would be preferred for the electric vehicle.

The above information disclosed in this Background section is provided only for enhancement of understanding of the background of the disclosure and therefore it may contain information that does not form the prior art that is already known in this country to a person of ordinary skill in the art.

SUMMARY

It is an object of the present disclosure to provide an apparatus and method capable of outputting a virtual driving sound such that a driver may experience a differentiated driving sensation and enjoyment in an electric vehicle.

It is another object of the present disclosure to provide an apparatus and method capable of outputting a virtual driving sound that simulates a sound generated from a driving system other than a driving system of an electric vehicle, such as an engine sound, in the electric vehicle.

It is a further object of the present disclosure to provide an apparatus and method capable of providing a virtual acceleration and deceleration sound differentiated depending on an acceleration and deceleration driving pattern of a driver in an electric vehicle.

The objects of the present disclosure are not limited to those described above, and other unmentioned objects of the present disclosure will be clearly understood by a person of ordinary skill in the art (hereinafter referred to as an "ordinary skilled person") from the following description.

In order to accomplish the object, in an aspect, the present disclosure provides a virtual sound provision method for an electric vehicle, the virtual sound provision method including collecting, by a controller, vehicle driving information for outputting a virtual engine sound during driving of an electric vehicle, determining, by the controller, a characteristic of a target sound corresponding to an acceleration and deceleration driving pattern of a driver from an accelerator pedal input value and a brake pedal input value of the driver, among the collected vehicle driving information, generating and outputting, by the controller, a sound control signal for outputting the virtual driving sound having the characteristic of the target sound based on the determined characteristic information of the target sound and characteristic information of an actual driving sound acquired by a microphone of the electric vehicle, and controlling operation of a sound device such that the virtual driving sound is generated and output according to the sound control signal output from the controller.

In another aspect, the present disclosure provides a virtual sound provision apparatus for an electric vehicle, the virtual sound provision apparatus including a driving information detector configured to detect vehicle driving information for outputting the virtual driving sound during driving of an electric vehicle, a microphone configured to detect an actual driving sound generated from the electric vehicle during driving of the electric vehicle, a controller configured to determine a characteristic of a target sound based on an acceleration and deceleration driving pattern of a driver from an accelerator pedal input value and a brake pedal input value of the driver, among the vehicle driving information detected by the driving information detector, and generating and outputting a sound control signal for outputting the virtual driving sound having the characteristic of the target sound based on the determined characteristic information of the target sound and characteristic information of the actual driving sound detected through the microphone, and a sound device configured to output a virtual engine sound that simulates an engine sound from the electric vehicle at the time of acceleration and deceleration according to the sound control signal output by the controller.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
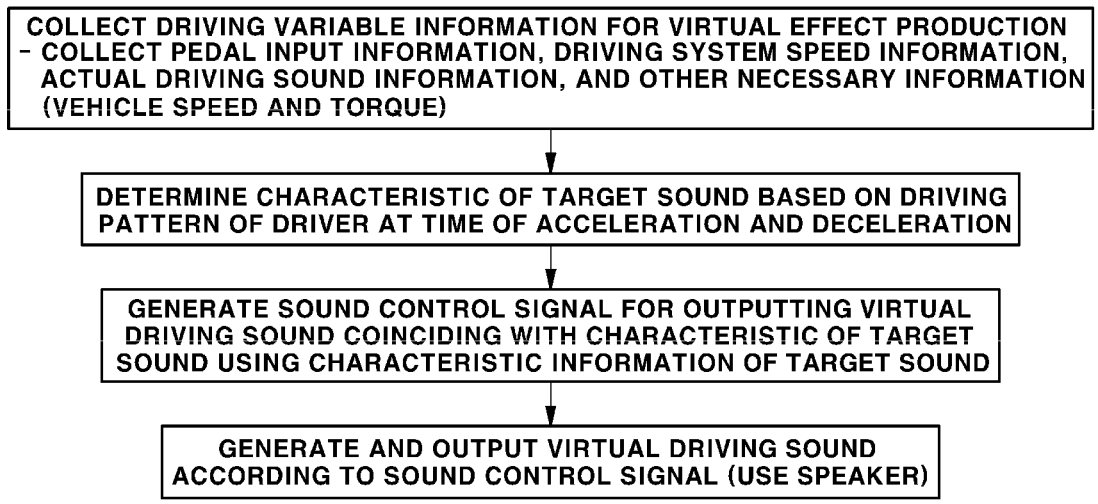
FIG. 1 is a block diagram showing a virtual sound provision method according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions of the embodiments of the present disclosure disclosed in this specification are given only for illustrating embodiments of the present disclosure. Embodiments of the present disclosure may be implemented in various forms. In addition, the embodiments according to the concept of the present disclosure are not limited to such specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood as being limited by these terms, which are used only to distinguish one element from another. For example, within the scope defined by the present disclosure, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

Wherever possible, the same reference numbers will be used throughout the drawings to refer to the same or like parts. The terms used in this specification are provided only to explain specific embodiments, but are not intended to restrict the present disclosure. A singular representation may include a plural representation unless it represents a definitely different meaning from the context.

The present disclosure relates to an apparatus and method capable of providing a virtual driving sound such that a driver may experience a differentiated driving sensation and excitement in an electric vehicle. In addition, the present disclosure relates to an apparatus and method capable of generating and providing a virtual driving sound that simulates a sound generated from a driving system other than a driving system of an electric vehicle, such as an engine sound, in the electric vehicle.

In particular, the present disclosure relates to an apparatus and method capable of providing a virtual acceleration and deceleration sound differentiated depending on an acceleration and deceleration driving pattern of a driver in an electric vehicle. Specifically, the present disclosure relates to an apparatus and method capable of recognizing a driving pattern of the driver at the time of acceleration and deceleration and providing a virtual engine sound differentiated depending on the acceleration and deceleration driving pattern.

A virtual sound provided in the present disclosure may be a sound that simulates a sound generated from a driving system other than a driving system of an electric vehicle, such as an engine (an internal combustion engine), which is a driving device of an internal combustion engine vehicle, during driving of the vehicle. Since the electric vehicle has no engine, the virtual sound may be a virtual engine sound that simulates an engine sound, not a sound generated from an actual engine.

That is, the virtual sound may be an engine sound assumed to be generated depending on a vehicle driving condition in the electric vehicle. Specifically, in the present disclosure, the virtual sound may be a virtual engine sound differentiated depending on an acceleration and deceleration driving pattern of a driver determined based on frequency of sudden acceleration, gradual acceleration, sudden deceleration, and gradual deceleration.

In the present disclosure, the acceleration and deceleration driving pattern, which is determined based on frequency of sudden acceleration, gradual acceleration, sudden deceleration, and gradual deceleration of the driver, indicates whether the driver has a driving tendency having a high frequency of sudden acceleration or gradual acceleration at the time of acceleration of the vehicle or whether the driver has a driving tendency having a high frequency of sudden deceleration or gradual deceleration at the time of deceleration of the vehicle.

In the present disclosure, the virtual sound is generated and output through a sound device of the vehicle. The sound device that generates and outputs the virtual sound may include a sound generator, an amplifier, and a speaker, such as a woofer.

Hereinafter, a virtual sound provision apparatus and method according to an embodiment of the present disclosure for generating and outputting a virtual driving sound differentiated based on information about an acceleration and deceleration driving pattern of a driver determined depending on frequency of sudden acceleration, gradual acceleration, sudden deceleration, and gradual deceleration in an electric vehicle will be described by way of example.

FIG. 1 is a block diagram showing a virtual sound provision method according to an embodiment of the present disclosure. In the present disclosure, characteristics of a target sound depending on a driving pattern of a driver are determined based on driving variable information collected in a vehicle in real time in order to provide a virtual driving sound. In addition, a sound control signal for outputting and playing the target sound is generated using the determined characteristics of the target sound.

A sound device generates a virtual sound signal according to the sound control signal, and outputs the virtual sound signal through a speaker as a virtual driving sound. As previously described, the virtual driving sound may be a virtual engine sound that simulates a sound generated from an engine during driving of an internal combustion engine vehicle.

Also, in the present disclosure, virtual engine vibration may be generated and implemented in the form of vehicle vibration in order to provide a virtual driving system sensation to a driver when outputting a virtual engine sound during driving of a vehicle, including during acceleration and deceleration. At this time, a motor may be used in order to implement the virtual engine vibration.

In the present disclosure, the vehicle vibration for implementing the virtual engine vibration and vehicle vibration for implementing virtual shift sensation, a description of which will follow, may be virtual vehicle vibration effects from which the driver can similarly feel the driving sensation felt in an internal combustion engine vehicle even in an electric vehicle.

In the present disclosure, vehicle vibration generated to provide virtual engine vibration and virtual shift sensation may be generated by controlling torque output of the motor. The torque output of the motor may be controlled by determining, by a first controller, a description of which will follow, a reference torque command and intervention torque for virtual effect production based on information collected from the vehicle, correcting the determined reference torque command by the determined intervention torque for virtual effect production to determine and generate a final motor torque command, and controlling the torque output of the motor according to the generated final motor torque command.

Here, the motor, which is a driving device of the electric vehicle, is a driving motor connected to a driving wheel via a decelerator to drive the vehicle. In the following description, the motor means a driving motor connected to the driving wheel to drive the vehicle unless specified otherwise. In addition, those skilled in the art will understand that internal combustion engine and engine are used interchangeably in the following description.

In the present disclosure, driving variable information for generating, producing, and providing a virtual effect including a virtual driving sound is collected in real time in the vehicle, a virtual sound signal is generated based on the collected driving variable information during driving of the vehicle, such as acceleration and deceleration, and the generated virtual sound signal is output through the speaker of the sound device as a virtual driving sound (production of a virtual sound effect).

In the present disclosure, the driving variable information input to the controller so as to be used to play and output the virtual driving sound is information about a real system that an electric vehicle has, and may be real-time vehicle driving information in the electric vehicle.

In addition, the driving variable information for playing and outputting the virtual driving sound may include sensor detection information detected by a sensor and input through a vehicle network. Specifically, the driving variable information may include an accelerator pedal input value (APS value) and a brake pedal input value (BPS value), which are pedal input information of the driver. The accelerator pedal input value, which is obtained by the driver manipulation of the accelerator pedal, may be information detected by an accelerator pedal detection unit. In addition, the brake pedal input value, which is obtained by the driver manipulation of the brake pedal, may be information detected by a brake pedal detection unit.

In addition, the vehicle driving information for generating, producing, and providing a virtual effect including the virtual driving sound in the vehicle may further include driving state information, such as motor torque, driving system speed, vehicle speed, or longitudinal acceleration of the vehicle. Here, the motor torque may be real torque determined by the controller based on the real-time vehicle driving information collected in the vehicle. At this time, the real torque may be a command value for controlling motor torque output, i.e., a motor torque command (reference motor torque command, a description of which will follow).

In addition, the driving system speed information, which is a rotational speed of a vehicle driving system part, may be a rotational speed of the motor (motor speed), a rotational speed of the driving wheel (driving wheel speed), or a rotational speed of a drive shaft (drive shaft speed). In addition, the vehicle speed and the longitudinal acceleration are information detected by the detection unit, such as the sensor, in the vehicle that is driving.

In the present disclosure, in order to generate and provide the virtual driving sound, characteristic information of an actual driving sound generated during driving of the vehicle may be further used in addition to the vehicle driving information. The actual driving sound is an actually generated sound detected by a microphone installed in the vehicle, as will be described below. In the present disclosure, characteristic information of the actual driving sound detected by the microphone may be used in order to generate and provide the virtual driving sound. Here, the characteristic information of the actual driving sound may include sound pressure level information.

When necessary information is collected in real time in the vehicle, as described above, a virtual sound signal based on the driving pattern of the driver is generated therefrom, and the virtual driving sound is output using the generated virtual sound signal.

In a process of generating the virtual sound signal, the controller determines the characteristics of a target sound based on the driving pattern of the driver using the vehicle driving information first, and outputs a sound control signal using the determined characteristic information of the target sound and characteristic information of the actual driving sound acquired by the microphone. Subsequently, the sound generator of the sound device generates a virtual sound signal having the characteristics of the target sound according to the sound control signal output from the controller. The generated virtual sound signal is amplified by the amplifier of the sound device and is output through the speaker of the sound device as a virtual driving sound.

Figure 2:
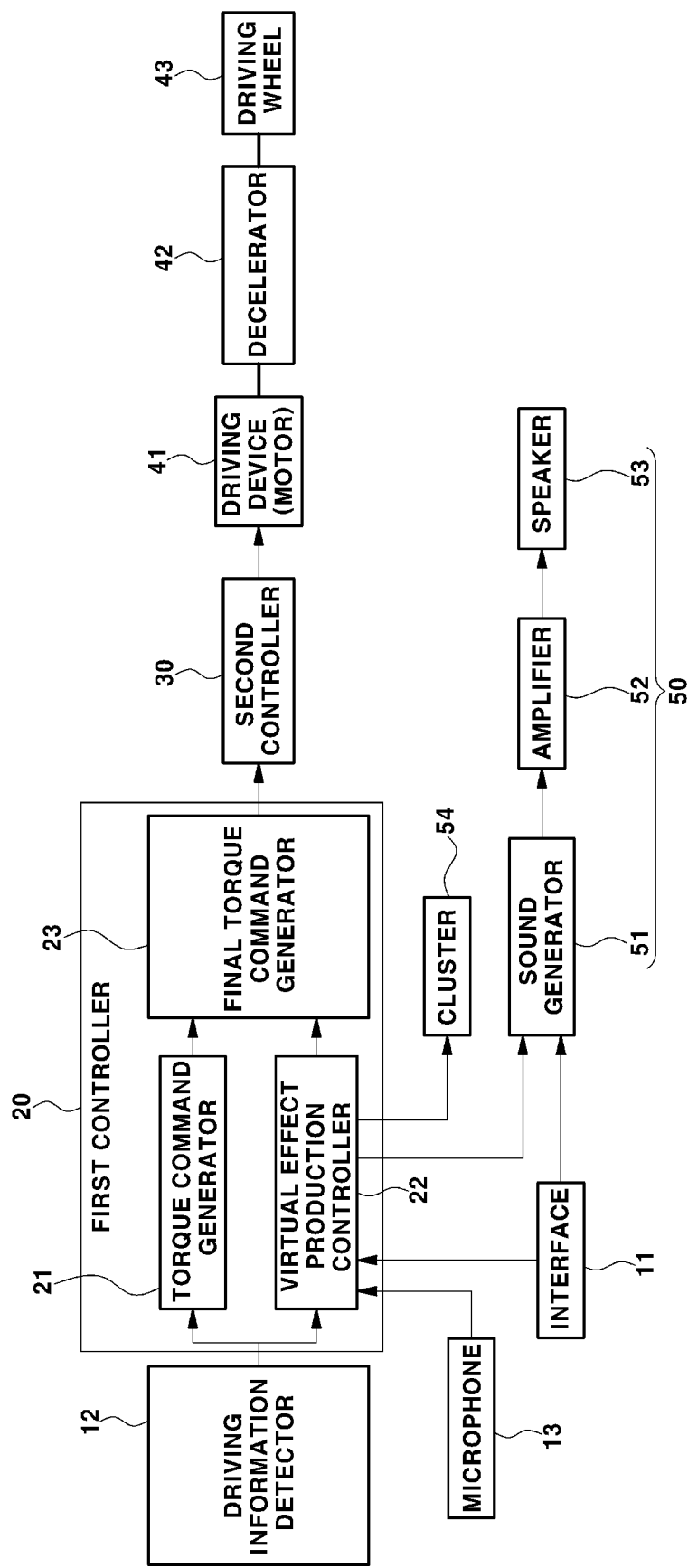
FIG. 2 is a block diagram showing the construction of a virtual sound provision apparatus according to an embodiment of the present disclosure.
Figure 3:
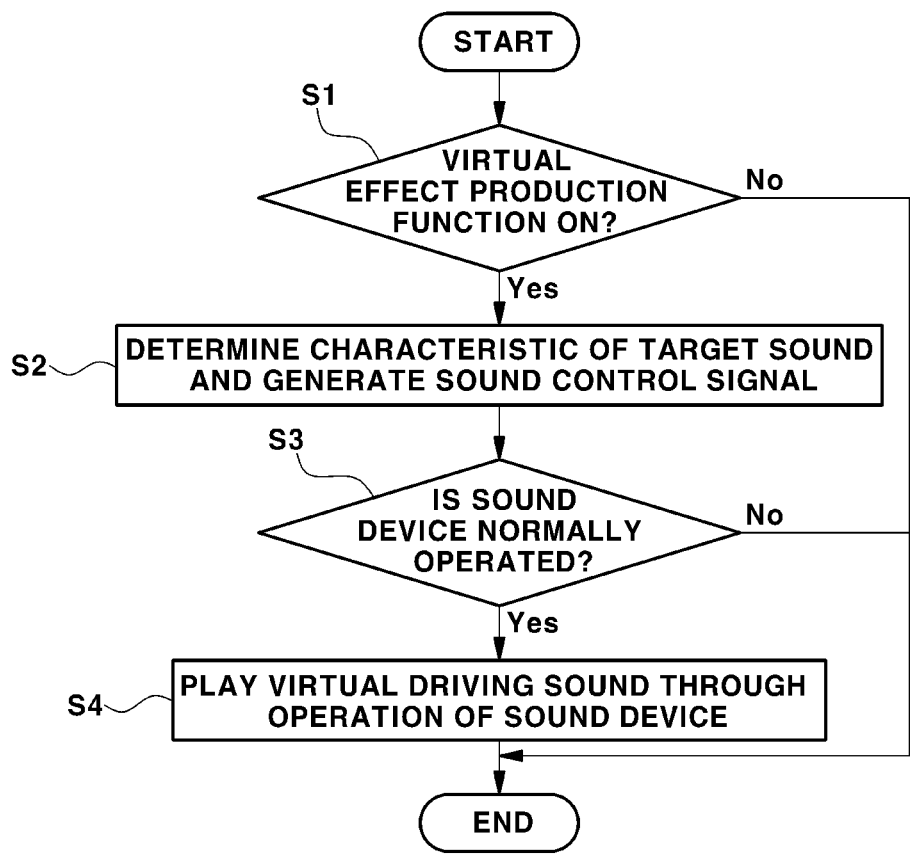
FIG. 3 is a flowchart showing a main process for providing a virtual sound according to an embodiment of the present disclosure.

FIG. 2 is a block diagram showing the construction of a virtual sound provision apparatus according to an embodiment of the present disclosure, and FIG. 3 is a flowchart showing a main process for providing a virtual sound according to an embodiment of the present disclosure.

As shown in FIG. 2, the virtual sound provision apparatus according to the embodiment of the present disclosure includes a driving information detector 12 configured to detect vehicle driving information during driving of the vehicle, a microphone 13 configured to detect an actual driving sound generated from the vehicle during driving of the vehicle, a first controller 20 configured to determine the characteristics of a target sound based on the acceleration and deceleration driving pattern of the driver from the vehicle driving information detected by the driving information detector 12 using predetermined driver emotion model information and to generate and output a sound control signal based on the characteristic information of the target sound and the characteristic information of the actual driving sound acquired through the microphone 13, and a sound device 50 configured to output a virtual driving sound, i.e., a virtual engine sound that simulates an engine sound from the vehicle at the time of acceleration and deceleration (virtual acceleration and deceleration sound) from the vehicle according to the sound control signal output by the first controller 20.

Here, the sound device 50 may include a sound generator 51 configured to generate a virtual sound signal having the characteristics of a target sound using the sound control signal and stored sound source data, an amplifier 52 configured to amplify the generated virtual sound signal, and a speaker 53, such as a woofer, configured to output the amplified virtual sound signal as a virtual driving sound. The speaker 53 is installed at at least one of the interior and the exterior of the vehicle. Preferably, a plurality of speakers 53 is installed at the vehicle so as to be used to output a virtual sound.

Since the engine (internal combustion engine) is generally at the front part of the internal combustion engine vehicle, the engine sound may be a sound generated from the front part of the vehicle during driving. In the present disclosure, therefore, the virtual engine sound may be set so as to be output from the speaker mounted at the front part of the vehicle.

Also, in the present disclosure, the first controller 20 generates and outputs a torque command based on the vehicle driving information, and a second controller 30 controls operation of a driving device 41 according to a final torque command output by the first controller 20. Here, the driving device 41 is a motor configured to drive the vehicle, and the torque command is a motor torque command. A method and process of determining and generating the motor torque command (reference torque command) for controlling torque output of the driving motor in the electric vehicle is well known in the art to which the present disclosure pertains, and a detailed description thereof will be omitted.

The first controller 20 and the second controller 30 are controllers participating in a control process for outputting the virtual sound and producing other virtual effects in the vehicle and a vehicle driving control process. In the following description, a control agent will be described as comprising a first controller and a second controller. However, the control process for outputting the virtual sound of the vehicle and producing the virtual effects and the driving control process according to the present disclosure may also be performed by a single integrated control element instead of a plurality of controllers.

The plurality of controllers and the single integrated control element may be commonly referred to as a controller, and the control process for outputting the virtual sound according to the present disclosure may be performed by the controller. At this time, the controller may commonly refer to the first controller 20 and the second controller 30.

In addition, the virtual sound provision apparatus according to the present disclosure may further include an interface 11 configured to allow the driver to selectively input one of on and off of a function of producing the virtual effects including the virtual sound.

Any device capable of allowing the driver to selectively manipulate on and off in the vehicle and outputting an electrical signal according to on and off may be used as the interface 11. For example, a manipulation device, such as a button or a switch, provided at the vehicle, or an input device or a touch screen of an audio, video, and navigation (AVN) system may be used.

The interface 11 may be connected to the first controller 20. More specifically, the interface 11 may also be connected to a virtual effect production controller 22, a description of which will follow. When the driver performs on or off manipulation through the interface 11, therefore, an on signal or an off signal from the interface 11 may be input to the virtual effect production controller 22 of the first controller 20. As a result, the virtual effect production controller 22 of the first controller 20 may recognize the on or off manipulated state of the virtual effect production function (including the virtual sound output function) by the driver (see step S1 of FIG. 3).

In the present disclosure, the virtual sound output function of outputting the virtual sound in the internal combustion engine using the sound device 50 during driving of the vehicle is performed only in the case in which the driver inputs on through the interface 11. Also, in the case in which the interface 11 is an input device for vehicles provided in the vehicle, the driver may perform on and off manipulation of the virtual effect production function through a mobile device as another example of the interface 11. The mobile device must be communicatively connected to a device in the vehicle, e.g., the first controller 20. To this end, an input and output communication interface for communicative connection between the mobile device and the first controller 20 is used.

In the present disclosure, the interface 11 may also be connected to the sound device 50, as shown in FIG. 2, and therefore the driver may select a vehicle type or vehicle grade or may adjust volume and tone of the virtual sound through the interface 11. That is, when the driver selects a desired vehicle type or vehicle grade through the interface 11, the sound device 50 may output a virtual sound corresponding to the vehicle type or vehicle grade selected by the driver, and the volume and tone of the virtual sound may be adjusted through manipulation at the interface 11.

The driving information detector 12 is a component configured to detect vehicle driving information (driving variable information) necessary to perform a virtual sound output function and a virtual engine vibration and virtual shift sensation implementation function together with vehicle driving information necessary to generate a reference torque command in the vehicle. In the embodiment of the present disclosure, the driving information detector 12 may include an accelerator pedal detector configured to detect accelerator pedal input information (driver's accelerator pedal input value) based on driver manipulation of the accelerator pedal and a brake pedal detector configured to detect brake pedal input information (driver's brake pedal input value) based on driver manipulation of the brake pedal.

Here, the accelerator pedal detector may be a common accelerator pedal position sensor (APS) installed at the accelerator pedal to output an electrical signal based on the driver's accelerator pedal manipulation state. In addition, the brake pedal detector may be a common brake pedal position sensor (BPS) installed at the brake pedal to output an electrical signal based on the driver's brake pedal manipulation state.

In addition, the driving information detector 12 may further include a speed detector configured to detect the speed of the vehicle driving system. Here, the speed of the vehicle driving system may be the rotational speed of the motor (motor speed), which is the driving device 41, the rotational speed of the driving wheel 43 (driving wheel speed), or the rotational speed of the drive shaft (drive shaft speed). At this time, the speed detector may be a resolver installed at the motor, a wheel speed sensor installed at the driving wheel 43, or a sensor capable of detecting the drive shaft speed.

In the present disclosure, the vehicle driving information may be used for a torque command generator 21, a description of which will follow, to generate a reference torque command, and may further include vehicle speed. In this case, the driving information detector 12 may further include a vehicle speed detector configured to detect the current driving vehicle speed, and the vehicle speed detector may include a wheel speed sensor installed at the driving wheel 43 of the vehicle.

Also, in the present disclosure, the driving information detector 12 may further include a longitudinal acceleration detector configured to detect longitudinal acceleration information of the vehicle, and the longitudinal acceleration detector may be a common longitudinal acceleration sensor installed at the vehicle to detect actual acceleration and deceleration of the vehicle.

The first controller 20 may include a torque command generator 21 configured to determine a reference torque command from the vehicle driving information detected by the driving information detector 12 during driving of the vehicle, a virtual effect production controller 22 configured to generate and output a sound control signal based on the vehicle driving information detected by the driving information detector 12 and the actual vehicle driving sound detected in real time through the microphone 13 and to determine intervention torque for virtual effect production, a description of which will follow, and a final torque command generator 23 configured to generate a final torque command from the reference torque command determined by the torque command generator 21 and the intervention torque for virtual effect production determined by the virtual effect production controller 22.

The reference torque command may be a motor torque command determined and generated based on the vehicle driving information collected during driving of a general electric vehicle. The torque command generator 21 may be a vehicle control unit (VCU) configured to generate a motor torque command based on vehicle driving information in a general electric vehicle or a portion thereof.

In addition, the virtual effect production controller 22 is a control element configured to perform overall control for implementing and providing the virtual effect including the virtual driving sound, the virtual engine vibration, and the virtual shift sensation. The virtual effect production controller 22 determines characteristic information of a target sound corresponding to the acceleration and deceleration driving pattern of the driver using the driver emotion model information from the accelerator pedal input value (APS value) and the brake pedal input value (BPS value), among the vehicle driving information.

In addition, the virtual effect production controller 22 generates and outputs a sound control signal for allowing the sound device 50 to generate and output a virtual driving sound having the characteristics of an actual target sound based on the determined characteristic information of the target sound and the characteristic information of the actual driving sound generated from the actual vehicle. The virtual effect production controller 22 may be added in the vehicle control unit (VCU) as a portion thereof, or may be provided as a separate control element other than the vehicle control unit.

In the process of generating the sound control signal, as described above, the virtual effect production controller 22 compares the characteristic value of the target sound with the characteristic value of the actual driving sound, and generates and outputs a sound control signal for coincidence between the characteristics of the actual driving sound (virtual driving sound) and the characteristics of the target sound. As a result, the sound device 50 may be controlled to output a virtual driving sound having the characteristics of the target sound, i.e., a virtual driving sound having characteristics coinciding with the characteristics of the target sound.

In the present disclosure, the target sound is basically a sound having characteristics determined by the drive sensation model using the driver's accelerator pedal input value and brake pedal input value as input. Also, in the present disclosure, the target sound is a sound having characteristics based on the acceleration and deceleration driving pattern of the driver. That is, the target sound is a sound differentiated by the acceleration and deceleration driving pattern of the driver at the time of acceleration or deceleration.

In the present disclosure, the characteristics of the target sound are determined as values based on the acceleration and deceleration driving pattern of the driver by the driver emotion model from the real-time accelerator pedal input value and brake pedal input value, and may include the point in time at which the virtual driving sound is output through the sound device 50, sound pressure level (SPL), frequency band, or pitch (high and low of the sound).

Consequently, the virtual effect production controller 22 may determine the characteristics of the target sound corresponding to the acceleration and deceleration driving pattern of the driver using the driver emotion model information, and may then generate and output a sound control signal for outputting the target sound from the sound device 50 (step S2 of FIG. 3). Here, the sound control signal may be a signal including information for coincidence between the characteristics of the actual driving sound and the characteristics of the target sound and the determined characteristic information of the target sound.

Also, in order to generate and produce virtual engine vibration using the motor, which is the vehicle driving device 41, in the electric vehicle, the virtual effect production controller 22 may be configured to determine intervention torque for virtual effect production, which is correction torque for generating virtual engine vibration. At this time, the virtual effect production controller 22 may be configured to determine intervention torque for virtual effect production interlocked with the determined characteristic value of the target sound. The intervention torque for virtual effect production determined by the virtual effect production controller 22 is input to the final torque command generator 23 so as to be used to correct the reference torque command.

The final torque command generator 23 may correct the reference torque command input from the torque command generator 21 using correction torque input from the virtual effect production controller 22, i.e., the intervention torque for virtual effect production, and may calculate a final torque command, which is the correction torque command. At the time of correction, the final torque command generator 23 may add the intervention torque for virtual effect production to the reference torque command to calculate the final torque command.

The second controller 30 is a controller configured to receive the torque command output from the first controller 20, i.e., the final torque command output from the final torque command generator 23 of the first controller 20, to control operation of the driving device 41. In the present disclosure, the driving device 41 may be a motor connected to the driving wheel 43 of the vehicle to drive the vehicle, and the second controller 30 may be a motor control unit (MCU) configured to drive the motor through the inverter and to control driving of the motor in the electric vehicle.

In the present disclosure, the intervention torque for virtual effect production is configured to impart vibration for virtual engine vibration and virtual shift sensation production to torque of the driving device 41, i.e., the motor, and is configured to produce and generate minute trembling of motor torque interlocked with the characteristics of the virtual driving sound (target sound) at the time of virtual engine vibration production.

The intervention torque for virtual effect production may have a command value having a predetermined frequency (or period) and amplitude (intensity) changed in a waveform. Alternatively, the intervention torque for virtual effect production may have a value interlocked with the characteristics of the virtual driving sound (target sound). For example, the intervention torque for virtual effect production may have a command value changed in intensity (corresponding to amplitude), frequency, and period of the sound, among the characteristics of the virtual driving sound.

In the embodiment of the present disclosure, torque and rotational force output by the driving device 41, i.e., the motor, are reduced by the decelerator 42 and are transmitted to the driving wheel 43, as shown in FIG. 2. When driving of the motor 41 is controlled according to the final torque command corrected by the intervention torque for virtual effect production, motor torque having minute vibration for simulating the virtual engine vibration applied thereto may be output during driving of the vehicle, including during acceleration and deceleration.

In FIG. 2, reference numeral 54 indicates a cluster installed at the front of a driver seat of the vehicle, and the current virtual engine speed and virtual shift stage may be displayed together with the current vehicle speed through the cluster 54.

In the above description, the vehicle driving information, which is the actual driving variable information, is used to produce and play the virtual driving sound. In order to produce and implement the virtual shift sensation, among the virtual effects, virtual variable information obtained from actual driving variable information may be used instead of the actual driving variable information. Specifically, virtual engine speed, which is virtual variable information obtained from the actual driving system speed, may be used to produce and implement the virtual shift sensation.

The virtual engine speed is virtual speed determined from the driving system speed, which is the actual driving variable information, by the virtual effect production controller 22 of the controller, i.e., the first controller 20. In the embodiment of the present disclosure, a predetermined virtual internal combustion engine model may be used in acquiring the virtual engine speed from the actual driving variable in the electric vehicle.

In the embodiment of the present disclosure, in the case in which a virtual internal combustion engine model including a virtual engine and a virtual transmission is used, the virtual engine speed is input speed of the virtual transmission. At this time, the virtual engine speed and the input speed of the virtual transmission may be determined to be values interlocked with the actual motor speed. That is, the virtual engine speed may be calculated as a variable multiple value of the driving system speed detected by the speed detector. Here, the driving system speed may be motor speed.

As described above, the motor speed may be multiplied by a coefficient, whereby the virtual engine speed may be calculated as a multiple of the motor speed. At this time, the value of a variable coefficient, by which the motor speed is multiplied in order to calculate the virtual engine speed, may be a value determined depending on the virtual transmission, a gear ratio model, and a virtual current shift stage. In addition, the virtual engine speed calculated as described above may be displayed through the cluster 54.

In order to generate and implement a multistage shift sensation through torque control of the driving motor, a control method for generating a virtual shift sensation in the electric vehicle may be applied to an electric vehicle having no multistage transmission together with the present disclosure. Also, in a control process for generating the virtual shift sensation in the electric vehicle, the virtual engine speed may be used as one of the virtual variables necessary to generate and implement the multistage shift sensation.

In addition, the virtual effect production controller 22 may determine the virtual engine speed using virtual vehicle speed and gear ratio information of the virtual current shift stage. Here, the virtual vehicle speed may be calculated to be a value directly proportional to the actual motor speed, which is one piece of the actual driving variable information, and a virtual longitudinal deceleration gear ratio. The virtual longitudinal deceleration gear ratio is a value preset in the virtual effect production controller 22.

As described above, the virtual vehicle speed may be calculated using the actual motor speed measured during driving of the vehicle and the virtual longitudinal deceleration gear ratio, and the virtual engine speed may be calculated in real time from the virtual vehicle speed. At this time, the virtual engine speed may be obtained from a value obtained by multiplying the virtual vehicle speed by the virtual gear ratio of the virtual current shift stage. Alternatively, the virtual engine speed may be obtained from a value obtained by multiplying the driving system speed, such as the motor speed, by the virtual gear ratio of the virtual current shift stage.

In addition, the virtual current shift stage may be determined from the virtual vehicle speed and the accelerator pedal input value (APS value) based on a shift schedule map preset in the virtual effect production controller 22. In addition, the virtual current shift stage determined as described above may be displayed through the cluster 54. When the virtual current shift stage is determined, as described above, the virtual engine speed may be calculated in real time using the virtual gear ratio corresponding to the shift stage and the virtual vehicle speed or the motor speed.

During driving of the electric vehicle, the torque command generator 21 determines a reference torque command in real time based on the vehicle driving information collected in the vehicle, and the virtual effect production controller 22 checks whether the virtual shift stage obtained from the current virtual vehicle speed and the accelerator pedal input value by the shift schedule map is different from a previous virtual shift stage. In the case in which the virtual shift stage is changed, it is determined that a shift event has commenced. That is, whether the virtual shift stage obtained by the shift schedule map is changed is checked, whereby change of the virtual shift stage means that a new virtual shift stage different from the current virtual shift stage is determined.

Upon determining that the shift event has commenced, the virtual effect production controller 22 determines the virtual shift stage newly obtained by the shift schedule map to be a virtual target shift stage, and determines shift class from the virtual current shift stage (shirt stage before change) and the virtual target shift stage.

Shift classes may be classified into power-on upshift, power-off upshift (lift-foot-up), power-on downshift (kickdown), power-off downshift, and near-stop downshift. One of the shift classes is selected and determined from the virtual current shift stage and the virtual target shift stage.

As described above, the virtual effect production controller 22 determines the current shift class in order to calculate intervention torque for virtual effect production, i.e., virtual shift intervention torque. For example, in the case in which the virtual target shift stage is a stage higher than the virtual current shift stage (i.e., virtual target shift stage>virtual current shift stage), the current shift class is upshift. On the other hand, in the case in which the virtual target shift stage is a stage lower than the virtual current shift stage (i.e., virtual target shift stage<virtual current shift stage), the current shift class is downshift. Also, in the case in which the reference torque command is greater than a predetermined reference torque value, the current shift class is power-on. On the other hand, in the case in which the reference torque command is less than a predetermined reference torque value, the current shift class is power-off.

Eventually, in the present disclosure, when the current shift class is determined based on the virtual current shift stage and the virtual target shift stage, a virtual shift intervention torque profile corresponding to the current shift class is selected from among shift class-based virtual shift intervention torque profiles, and virtual shift intervention torque for generating a virtual shift sensation may be determined in real time according to the selected virtual shift intervention torque profile. At this time, a virtual shift intervention torque value corresponding to the current virtual shift progress may be determined from the selected virtual shift intervention torque profile.

The virtual shift intervention torque profile is information set for each shift class in the virtual transmission model of the virtual effect production controller 22. In the virtual shift intervention torque profile, the magnitude of the virtual shift intervention torque may be adjusted using one of the virtual engine speed, the accelerator pedal input value (APS value), the motor torque (reference torque command generated by the torque command generator), the virtual shift stage, and the virtual target shift stage or two or more combinations thereof as a torque magnitude setting variable.

In addition, the virtual effect production controller 22 starts counting from the point in time at which the virtual shift stage is changed (i.e., the point in time at which a new virtual target shift stage is determined) in a state in which time is 0, and may determine the percentage (%) of the counted time to predetermined total shift time as a virtual shift progress. As time passes, the virtual shift progress increases to 100%. When the virtual shift progress (%) is determined in real time, as described above, the virtual effect production controller 22 determines a virtual shift intervention torque value corresponding to the determined virtual shift progress from the virtual shift intervention torque profile.

Eventually, when the virtual shift intervention torque (intervention torque for virtual effect production) is determined in real time, the final torque command generator 23 corrects the reference torque command determined by the torque command generator 21 by the virtual shift intervention torque determined by the virtual effect production controller 22 to determine and generate a final motor torque command in real time, and controls the torque output of the motor according to the final motor torque command, as previously described.

Torque having the virtual shift intervention torque reflected therein in real time is output from the motor through the motor torque output control, and a virtual shift sensation is implemented and provided by the motor torque output at this time.

In the above description, the construction of the apparatus for generating and providing the virtual effects including the virtual sound in the electric vehicle has been described. In the present disclosure, the acceleration and deceleration driving pattern of the driver is determined based on pedal input information of the driver accumulated during driving of the vehicle, and a differentiated virtual engine sound corresponding to the acceleration and deceleration driving pattern is provided.

In the present disclosure, the acceleration and deceleration driving pattern of the driver may be determined from frequency of gradual acceleration, sudden acceleration, gradual deceleration, and sudden deceleration performed and accumulated during previous driving of the vehicle, and the frequency of gradual acceleration, sudden acceleration, gradual deceleration, and sudden deceleration may be obtained from pedal input information of the driver collected during previous driving of the vehicle. Here, the pedal input information of the driver may be information about the driver manipulation of the accelerator pedal and the driver manipulation of the brake pedal during previous driving of the vehicle.

Also, in the present disclosure, the controller (i.e., the first controller 20) determines characteristics of a target sound corresponding to the acceleration and deceleration driving pattern of the driver from real-time driving variable information (vehicle driving information) using the driver emotion model, as previously described. Here, the real-time driving variable information includes an accelerator pedal input value (APS value) and a brake pedal input value (BPS value) of the driver.

Also, in the present disclosure, the controller (i.e., the first controller 20) generates and outputs a sound control signal based on the determined characteristic information of the target sound and characteristic information of an actual driving sound acquired through the microphone 13. Here, the characteristic information of the actual driving sound may include sound pressure level information.

In this case, the controller 20 compares sound pressure level information, among the characteristic information of the target sound, with the sound pressure level information of the actual driving sound, and generates and outputs a sound control signal for coincidence between a sound pressure level value of the actual driving sound and a sound pressure level value of the target sound. As previously described, the sound control signal may be a signal including the determined characteristic information of the target sound together with information for coincidence between the characteristics (sound pressure level) of the actual driving sound and the characteristics (sound pressure level) of the target sound.

Consequently, the sound generator 51 of the sound device 50 may generate a virtual sound signal such that the target sound is output through the speaker 53 using the sound control signal output from the controller 20 and pre-stored sound source data. In addition, the virtual sound signal generated by the sound generator 51 is amplified by the amplifier 52, and the amplified virtual sound signal is output through the speaker 53 as a virtual driving sound (step S4 of FIG. 3). Referring to FIG. 3, the sound control signal is generated in step S2, and in the case in which the sound device 50 is normally operated in step S3, the virtual driving sound is played through the sound device 50 in step S4.

Figure 4:
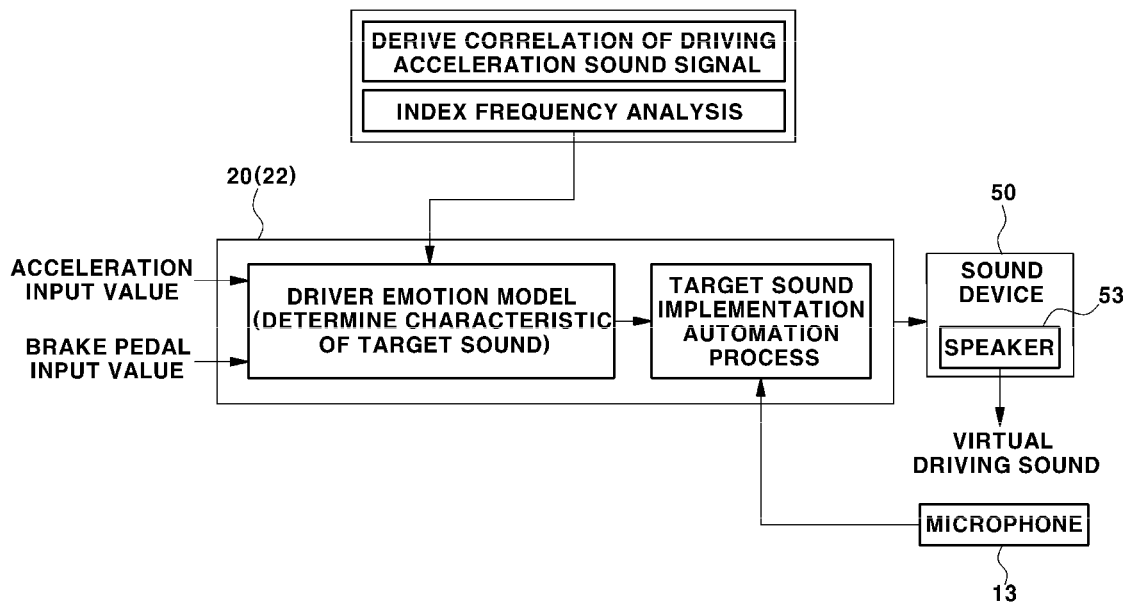
FIG. 4 is a block diagram schematically showing a process of playing, by a controller and a sound device, a sound personalized for each driving pattern in the present disclosure.

FIG. 4 is a block diagram schematically showing a process of playing, by the controller and the sound device, a sound personalized for each driving pattern in the present disclosure. Here, the controller is the first controller 20 in the embodiment of FIG. 2, specifically the virtual effect production controller 22 of the first controller 20.

As shown in FIG. 4, the controller determines the characteristics of the target sound depending on the acceleration and deceleration driving pattern of the driver using the driver emotion model based on the accelerator pedal input value and the brake pedal input value of the driver. In addition, the controller generates a sound control signal based on the determined characteristic information of the target sound and the characteristic information of the actual driving sound. At this time, the controller compares the sound pressure level information, among the characteristic information of the target sound, with the sound pressure level information, which is the characteristic information, of the actual driving sound, and in the case in which there is a difference in sound pressure level therebetween, generates and outputs a sound control signal as a kind of feedback control signal for solving the difference in sound pressure level.

Subsequently, the sound generator 51 of the sound device 50 generates a virtual sound signal adjusted so as to have a characteristic value of the target sound from the sound source data according to the sound control signal. The virtual sound signal is amplified by the amplifier 52 and is output through the speaker 53 as a virtual driving sound, as previously described.

The driver emotion model is previously constructed in the controller to as to be used, and is set using data collected and acquired for a vehicle type through a process performed in a vehicle development step, such as preliminary tests and evaluation. In the present disclosure, the driver emotion model is previously input and stored in the controller of the actually applied vehicle so as to be used to determine the characteristics of the target sound.

The driver emotion model constructed in the controller of the vehicle may be a model having a characteristic value of the target sound defined based on a pedal input value for each acceleration and deceleration driving pattern of the driver so as to be used to generate and output a target virtual driving sound, particularly a differentiated virtual driving sound based on the acceleration and deceleration driving pattern of the driver.

When the controller determines the acceleration and deceleration driving pattern of the driver based on the pedal input information collected and accumulated during driving of the vehicle, therefore, the characteristic value of the target sound corresponding to the determined acceleration and deceleration driving pattern may be determined by the driver emotion model.

Here, when describing the process of setting and constructing the driver emotion model in the vehicle development step in more detail, DB analysis for senses of acceleration and deceleration and frequency, sound pressure level, accelerator pedal input value, brake pedal input value, and acceleration and deceleration driving pattern, which are factors of the acceleration and deceleration sound, may be performed, correlation of a driving sound may be derived through sound tuning based on the pedal input value and the acceleration and deceleration, and an index may be developed and used to construct the driver emotion model.

At this time, in order to derive correlation of a driving sound (acceleration and deceleration sound) preferred by the driver, an algorithm is configured through driver behavior pattern survey and hearing evaluation, and correlation of the driving sound may be derived through correlation analysis of openness, conscientiousness, extraversion, agreeableness, and neuroticism based on a sound environment.

In addition, an index based on frequency analysis may be developed using the derived correlation of the driving sound, and the index may be determined based on tone having high preference or tone having low preference for each driving pattern in a frequency-analysis-based index development process. In addition, a sound differentiated for each driving pattern may be synthesized or a sound may be developed based on the index determined based on frequency analysis and information indicating the degree of openness, conscientiousness, extraversion, agreeableness, and neuroticism in order to define a target sound and the characteristics thereof.

In order to generate and output the driving sound differentiated for each driving pattern, driving patterns indicating usual driving tendency of the driver at the time of acceleration and deceleration are defined based on frequency of gradual acceleration, sudden acceleration, gradual deceleration, and sudden deceleration in the vehicle development step, and longitudinal acceleration of the vehicle and change in indoor sound pressure level may be measured and indexed for each driving pattern. A driver emotion model capable of determining the characteristics of the target sound differentiated depending on the acceleration and deceleration driving pattern of the driver in the vehicle type may be developed and constructed through the above process.

Also, in the present disclosure, the target sound may be implemented through active sound design (ADS) using real-time driving variable information as input. When the controller determines the characteristics of the target sound through the driver emotion model, a sound control signal for playing and outputting the target sound may be generated from the characteristic information of the target sound and the characteristic information of the actual driving sound (real-time sound information detected through the microphone) through a predetermined target sound implementation automation process, and a virtual driving sound personalized based on the target sound may be played.

The target sound implementation automation process is an automation process of controlling the virtual sound using the target sound determined by the driver emotion model and the actual driving sound, and includes a process of comparing the sound pressure level of the target sound with the sound pressure level of the actual driving sound.

Meanwhile, in the present disclosure, the controller of the vehicle determines the acceleration and deceleration driving pattern of the driver based on the pedal manipulation information of the driver accumulated during driving of the vehicle. This will be described with reference to FIG. 5.

Figure 5:
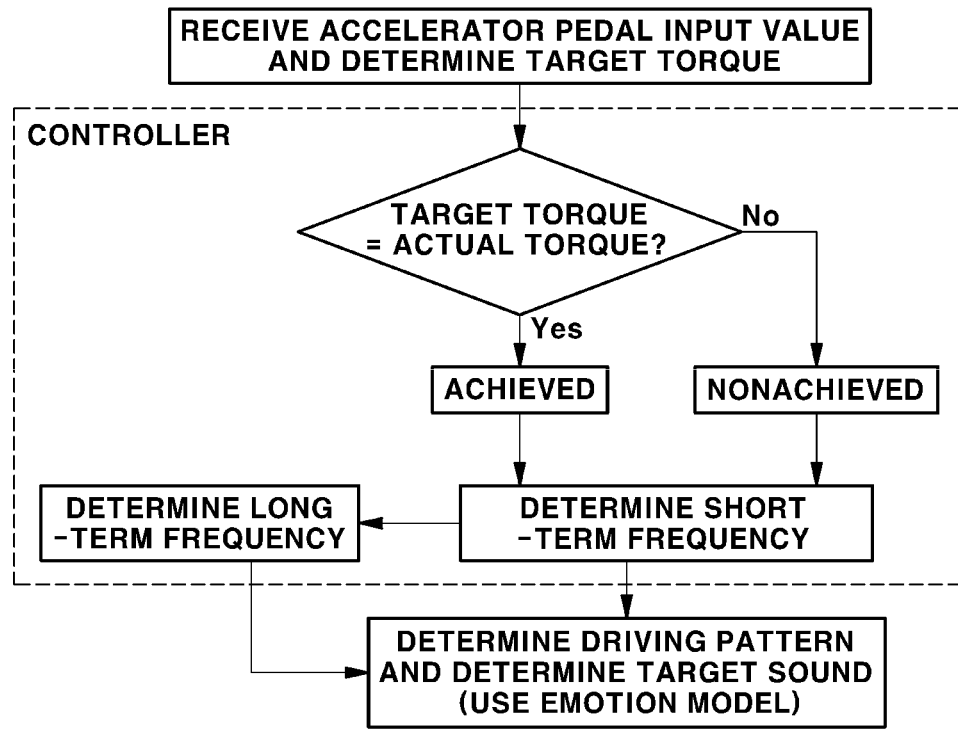
FIG. 5 is a view showing a method of determining an acceleration driving pattern of a driver in the present disclosure.

FIG. 5 is a view showing a method of determining the acceleration driving pattern of the driver in the present disclosure. As shown in FIG. 5, when the driver manipulates the accelerator pedal during driving of the vehicle, the controller may determine a target torque value from the accelerator pedal input value (APS value). Here, the target torque may be driver requested torque determined based on the accelerator pedal input value (APS value) at the time of manipulation of the accelerator pedal. A method of determining the driver requested torque, which is the target torque, from the accelerator pedal input value is well known, and therefore a detailed description thereof will be omitted.

After the driver manipulates the accelerator pedal, the controller determines a target torque value, and increases a motor torque command at a predetermined torque inclination until reaching the target torque. Here, the motor torque command may be a reference torque command or a final torque command determined by the first controller 20 in the apparatus of FIG. 2. The motor torque command value may be an actual torque value output by the driving device 41 of the vehicle, i.e., the motor.

In addition, while the motor torque command is increased at the torque inclination, the controller determines whether the driver performs the next manipulation before the motor torque command value, i.e., the actual torque value, reaches the target torque value ("nonachieved" of FIG. 5) or determines whether the driver performs the next manipulation after the actual torque value reaches the target torque value ("achieved" of FIG. 5). Here, the next manipulation may include additional manipulation of the accelerator pedal after the accelerator pedal is manipulated. Specifically, the next manipulation may include both an additional manipulation state in which the driver completely takes their foot off the accelerator pedal and an additional manipulation state in which the accelerator pedal input value is changed.

As described above, the controller checks whether the actual torque value reaches the target torque during driving of the vehicle, and obtains an achievement rate (or nonachievement rate) (%) checked during one-time driving from key on to key off as short-term frequency information. In addition, after the achievement rate during one-time driving, which is the short-term frequency information, is stored, the controller accumulates and averages the achievement rate obtained whenever one-time driving is performed, and obtains the average of the achievement rates as long-term frequency information.

Subsequently, the controller may determine the acceleration and deceleration driving pattern of the driver based on the accumulated average of the achievement rates (%), which is the long-term frequency value, and the acceleration and deceleration driving pattern of the driver may be determined depending on whether the accumulated average, which is the long-term frequency value, is large or small. At this time, the controller may previously set the driving pattern into a plurality of steps divided depending on the accumulated average of the achievement rates.

To this end, the controller sets critical values for dividing the plurality of steps based on the accumulated average, and sets a range of the driving pattern for each step based on the critical values. Consequently, the controller may compare the current accumulated average with the critical values to determine a step having a range to which the current accumulated value belongs as the acceleration and deceleration driving pattern of the driver.

In the case in which the controller performs settings such that the short-term frequency value is obtained from the achievement rate and the long-term frequency value is obtained from the accumulated average of the achievement rates, the driving tendency exhibits higher frequency of gradual acceleration in the case in which the accumulated average is larger and the driving tendency exhibits higher frequency of sudden acceleration in the case in which the accumulated average is smaller.

In the case in which the accumulated average of the achievement rates is small, the driver has an extraverted and neurotic personality, and the driver emotion model may be set such that the characteristics of the target sound are determined in consideration of extraversion and neuroticism.

Although an example in which the short-term frequency value is obtained as the value of achievement rate (%) and the long-term frequency value is obtained as the accumulated average (%) has been described above, the nonachievement rate, which has an opposite meaning, may be used instead of the achievement rate. That is, the value of nonachievement rate may be used as the short-term frequency value, and the accumulated average of nonachievement rates may be used as the long-term frequency value. The achievement rate is a ratio of the number of times of achievement to the total number of times of manipulation of the accelerator pedal, and the nonachievement rate is a ratio of the number of times of nonachievement to the total number of times of manipulation of the accelerator pedal.

Figure 6:
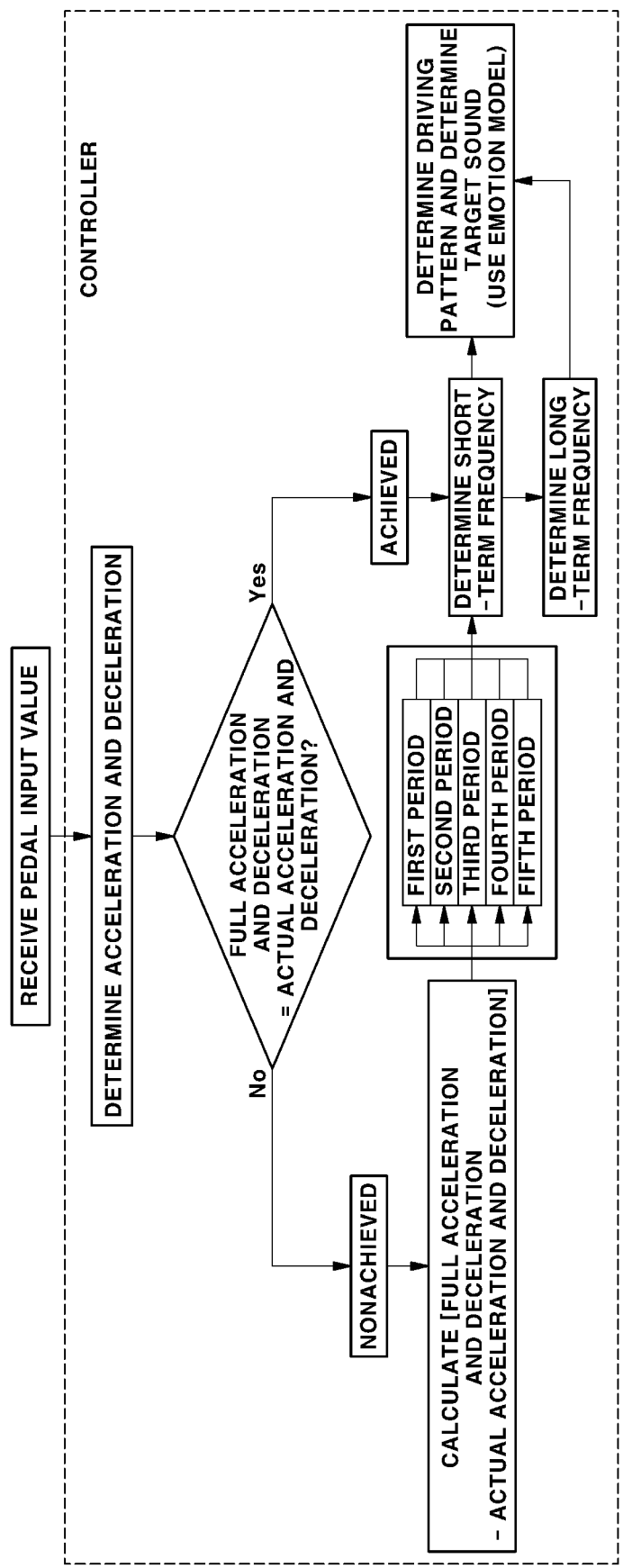
FIG. 6 is a view showing a method of determining an acceleration and deceleration driving pattern of a driver in the present disclosure.

FIG. 6 is a view showing a method of determining the acceleration and deceleration driving pattern of the driver in the present disclosure. The acceleration driving pattern of the driver may be determined using the method described with reference to FIG. 5 or may be determined using the method of FIG. 6, a description of which will follow. The deceleration driving pattern of the driver may be determined using the method of FIG. 6.

As shown in FIG. 6, in the case in which the driver manipulates the accelerator pedal during driving of the vehicle, the controller determines target acceleration from the accelerator pedal input value (APS value). In the following description, the target acceleration will be defined as actual acceleration. A method of determining the target acceleration from the accelerator pedal input value is well known, and therefore a detailed description thereof will be omitted.

When the actual acceleration is determined, as described above, the controller compares the determined actual acceleration with predetermined full acceleration, and in the case in which the actual acceleration corresponds to the full acceleration, determines that the current state is an achieved state. Here, the full acceleration may be defined as target acceleration when the accelerator pedal is fully manipulated.

In addition, the controller checks whether the current state is an achieved state in which the actual acceleration corresponds to the full acceleration during driving of the vehicle, and obtains an achievement rate (%) checked during one-time driving from key on to key off as short-term frequency information. Here, the achievement rate (%) is defined as a ratio of the number of times of achievement to the total number of times of manipulation of the accelerator pedal.

After the achievement rate (%) during one-time driving, which is the short-term frequency information, is stored, the controller accumulates and averages the achievement rate obtained whenever one-time driving is performed, and obtains the average of the achievement rates as long-term achievement rate information, which is long-term frequency information.

Also, in the case in which the actual acceleration does not correspond to the full acceleration, the controller determines that the current state is a nonachieved state. In the case in which the current state is a nonachieved state, the controller calculates a difference value between the full acceleration and the actual acceleration, and determines a period corresponding to the difference value, among a plurality of manipulation periods. To this end, a plurality of manipulation periods in which an overall range is divided into predetermined ranges based on the difference value between the full acceleration and the actual acceleration is previously set in the controller. Consequently, the controller determines a period having a range to which the difference value belongs, among the plurality of manipulation periods, as the current manipulation period.

Subsequently, the controller counts the number of times of each manipulation period determined during one-time driving from key on to key off, and calculates and stores a nonachievement rate (%), which is a ratio of the number of times of each manipulation period to the total number of times of the nonachieved state, for each manipulation period. Subsequently, the controller calculates the stored nonachievement rate (%) for each manipulation period whenever the vehicle drives once, accumulates and averages the nonachievement rate for each manipulation period, and obtains the accumulated average of the nonachievement rate for each period as long-term nonachievement rate information, which is long-term frequency information.

As a result, the controller may determine the acceleration driving pattern of the driver based on the long-term achievement rate value and the long-term nonachievement rate value for each period. For example, a manipulation period in which the full acceleration and the actual acceleration coincide with each other is added, and the controller determines a manipulation period corresponding to a larger one of the long-term achievement rate value and the long-term nonachievement rate value for each period as a period corresponding to the acceleration driving pattern of the driver. At this time, the manipulation periods divided based on the achievement and nonachievement rates may be driving pattern information indicating the driving tendency of the driver.

In the above description, the actual acceleration and the full acceleration may be replaced with an accelerator pedal input value (APS value) and the maximum accelerator pedal input value (full accelerator pedal value based on APS value), respectively. In addition, the above description is given to determine the acceleration driving pattern. In the case in which the accelerator pedal is replaced with the brake pedal, the accelerator pedal input value is replaced with the brake pedal input value, and acceleration, such as the actual acceleration and the full acceleration, is replaced with deceleration, such as the actual deceleration and the full deceleration, in the above description, a method of determining the deceleration driving pattern of the driver is provided. In addition, the actual acceleration and the actual deceleration may be actual vehicle acceleration and actual vehicle deceleration detected by the longitudinal acceleration sensor of the vehicle, respectively.

In the present disclosure, the acceleration and deceleration driving pattern of the driver determined as one of the plurality of steps or the plurality of periods is information indicating whether the driver frequently performs gradual acceleration or sudden acceleration and information indicating whether the driver frequently performs gradual deceleration or sudden deceleration.

In addition, the driver emotion model in the controller is set to determine the target sound and the characteristic value thereof for each defined acceleration and deceleration driving pattern. During construction of the driver emotion model, the longitudinal acceleration of the vehicle and change in indoor sound pressure level (volume) may be measured and indexed at the time of gradual acceleration, sudden acceleration, gradual deceleration, and sudden deceleration of the internal combustion engine vehicle.

In addition, during construction of the driver emotion model, information, such as the measured longitudinal acceleration and deceleration data, sound pressure level data, and a sound pressure level (volume) profile depending on change in longitudinal acceleration and deceleration obtained based on these data, may be used. At this time, an acceleration curve and a deceleration curve may be changed depending on the driving pattern, such as gradual acceleration, sudden acceleration, gradual deceleration, and sudden deceleration, of the electric vehicle in order to differentiate the virtual sound. For example, an acceleration curve of a driver having high frequency of gradual acceleration driving and an acceleration curve of a driver having high frequency of sudden acceleration driving may be differently set, and the characteristics of the target sound may be differentiated and set depending on the acceleration curve for each driving pattern.

In addition, active sound design (ASD) implementation of the target sound is possible through analysis of senses of acceleration and deceleration of the electric vehicle and frequency, sound pressure level (SPL) (dB), pedal input values (APS value and BPS value), vehicle speed (KPH), and motor torque, which are factors of the acceleration and deceleration sound. In this process, an RPM-sound pressure level (dB) profile for each order, an RPM-pedal input value (APS and BPS) correction profile, a vehicle speed profile, and a motor torque correction profile may be generated and used to construct the driver emotion model. In addition, correlation between the acceleration and deceleration sound and the frequency band may be analyzed through sound source analysis, and the characteristics of the sound and the frequency band may be classified so as to be used to construct the driver emotion model.

Figure 7:
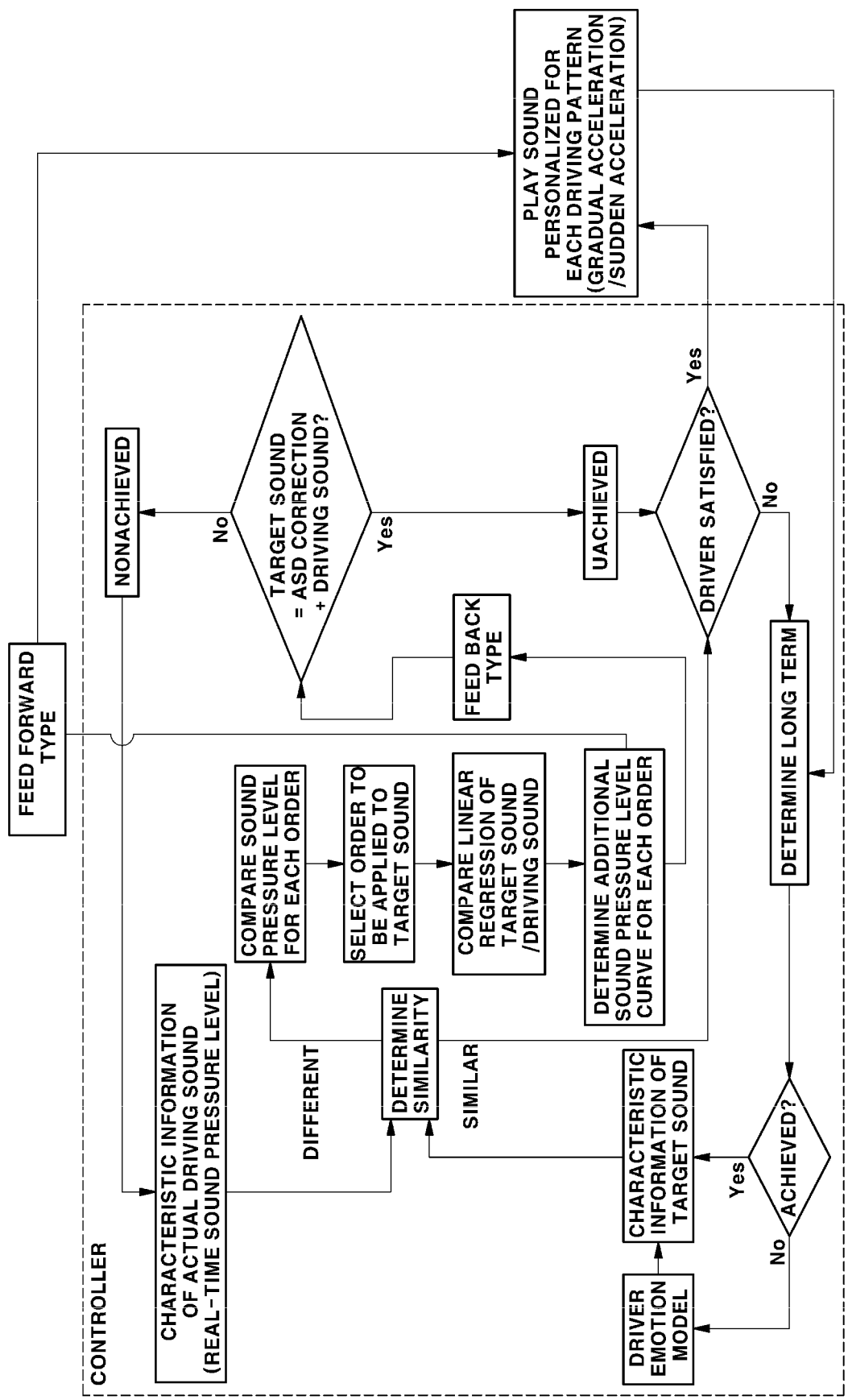
FIG. 7 is a flowchart showing an example of an automation process for implementing a target sound in the present disclosure.

FIG. 7 is a flowchart showing an example of an automation process for implementing the target sound in the present disclosure, and shows a method of controlling the virtual sound using characteristic information of the target sound determined by the driver emotion model and characteristic information of the actual driving sound. Here, the characteristic information may be sound pressure level information, and the sound pressure level of the target sound is characteristic information of the target sound determined by the controller as a value based on the acceleration and deceleration driving pattern of the driver by the driver emotion model using real-time driving variable information, such as the accelerator pedal input value and the brake pedal input value, as input. In addition, the sound pressure level of the actual driving sound is real-time sound pressure level of the actual driving sound detected by the microphone.

As shown in FIG. 7, the controller compares the real-time sound pressure level of the vehicle (i.e., the sound pressure level of the actual driving sound) with the sound pressure level of the target sound to check similarity between the actual driving sound and the target sound. Also, in the case in which the real-time sound pressure level of the vehicle and the sound pressure level of the target sound are different from each other, the controller performs a process of controlling output of the virtual sound.

As shown in FIG. 7, a main process in controlling the virtual sound may include a process of comparing the real-time sound pressure level with the sound pressure level of the target sound for each order and selecting orders having a great difference between the real-time sound pressure level and the sound pressure level of the target sound. Also, in order to generate an additional sound pressure level curve of the selected orders, linear regression analysis and comparison are performed, an additional sound pressure level curve for implementing a target sound is generated through the linear regression analysis and comparison, and a sound control signal for controlling a virtual sound is generated and output based on the additional sound pressure level curve. Consequently, the sound device may be generated and output a virtual sound according to the sound control signal output by the controller.

The present disclosure proposes a sound differentiation correction technique for generating and outputting a virtual driving sound differentiated for each acceleration and deceleration driving pattern, and an RPM-sound pressure level (dB) profile for each order, an RPM-pedal input value (APS) correction profile, a vehicle speed profile, and a motor torque correction profile are generated.

At this time, the controller determines the characteristic value, such as sound pressure level, of the target sound, compares sound pressure level of the target sound for each order with real-time sound pressure level (sound pressure level of the actual driving sound), extracts and selects an order necessary for ASD, and utilizes an RPM-sound pressure level (dB) curve for each order of the target sound.

Subsequently, the controller performs linear regression analysis and comparison using the RPM-sound pressure level (dB) curve for each order of the target sound and an RPM-sound pressure level curve for each order of the actual driving sound, and calculates a difference in sound pressure level between periods to generate a sound pressure level profile for each order. Subsequently, the controller generates an RPM-pedal input value (APS and BPS) curve for each order, and generates a representative RPM-APS setting and ASD correction profile.

Figure 8:
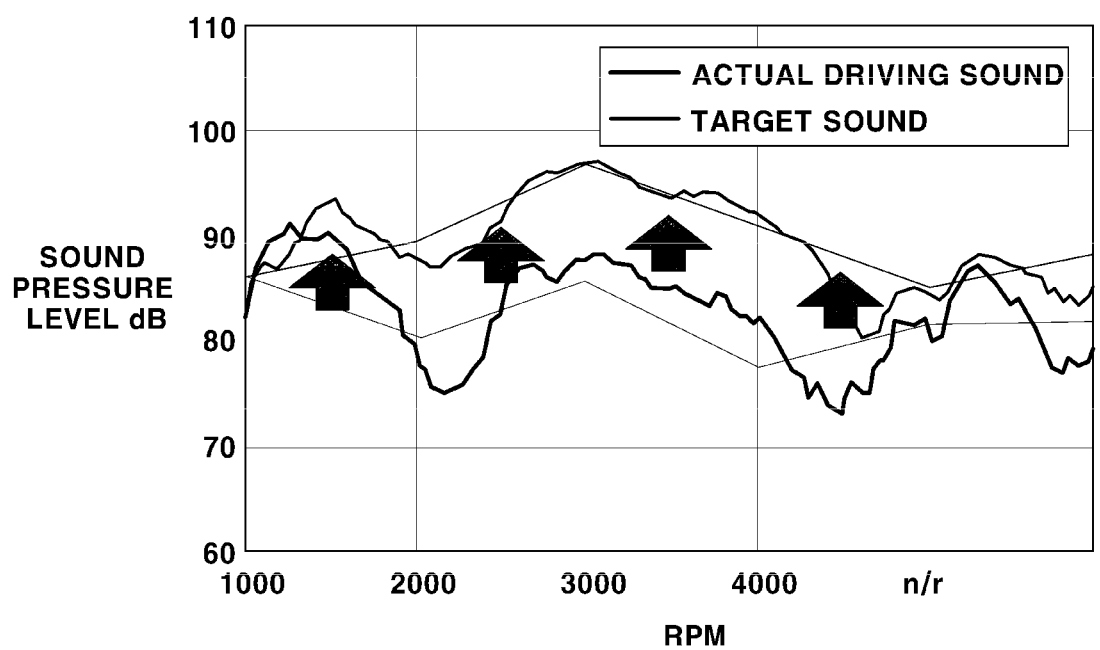
FIG. 8 is a view showing a generation example of a sound pressure level profile for each order in the present disclosure.
Figure 9:
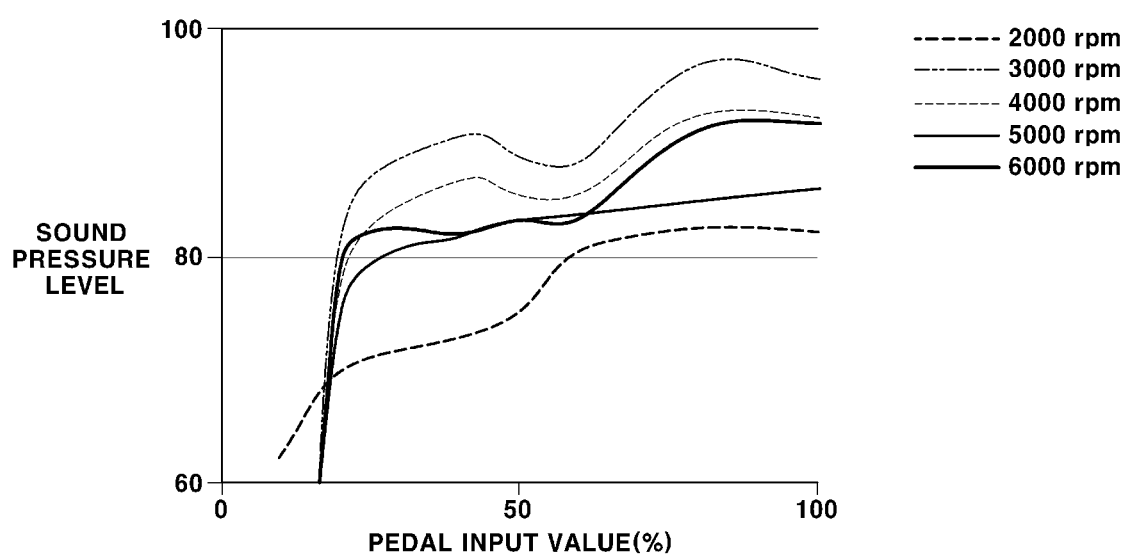
FIG. 9 is a view showing an example of an RPM-sound pressure level curve for each order and each RPM.

FIG. 8 is a view showing a generation example of a sound pressure level profile for each order in the present disclosure, and FIG. 9 is a view showing an example of an RPM-sound pressure level curve for each order and each RPM.

In the virtual sound provision method for electric vehicles according to the present disclosure, as described above, it is possible to provide a virtual driving sound differentiated for each acceleration and deceleration driving pattern of the driver determined based on individual preference and driving tendency of the driver, particularly frequency of gradual acceleration, sudden acceleration, gradual deceleration, and sudden deceleration, whereby it is possible to improve vehicle marketability.

As is apparent from the foregoing, in a virtual sound provision apparatus and method for electric vehicles according to the present disclosure, it is possible to output and provide a virtual driving sound such that a driver may experience a differentiated driving sensation and excitement in an electric vehicle. Also, it is possible to output and provide a virtual driving sound that simulates a sound generated from a driving system other than a driving system of an electric vehicle, such as an engine sound, in the electric vehicle. Particularly, it is possible to provide a virtual acceleration and deceleration sound differentiated depending on an acceleration and deceleration driving pattern of the driver in the electric vehicle.

The effects of the present disclosure are not limited to those mentioned above, and other unmentioned effects will be clearly understood by an ordinary skilled person from the above description.

It will be apparent to a person of ordinary skill in the art that the present disclosure described above is not limited to the above embodiments and the accompanying drawings and that various substitutions, modifications, and variations can be made without departing from the technical idea of the present disclosure.

What is claimed is:

1. A virtual sound provision method for an electric vehicle, the virtual sound provision method comprising the steps of:
   collecting, by a controller, vehicle driving information for outputting a virtual driving sound during driving of the electric vehicle;
   determining, by the controller, a characteristic of a target sound corresponding to an acceleration or deceleration driving pattern of a driver from an accelerator pedal input value and a brake pedal input value of the driver, among the collected vehicle driving information;
   generating and outputting, by the controller, a sound control signal for outputting the virtual driving sound having the characteristic of the target sound based on the determined characteristic information of the target sound and characteristic information of an actual driving sound acquired by a microphone of the electric vehicle; and
   controlling operation of a sound device such that the virtual driving sound is generated and output according to the sound control signal output from the controller,
   wherein the step of determining the characteristic of the target sound comprises the step of
   determining, by the controller, the acceleration or deceleration driving pattern of the driver based on pedal manipulation information of the driver accumulated during driving of the electric vehicle,
   wherein the acceleration or deceleration driving pattern of the driver is determined from frequency of gradual acceleration, sudden acceleration, gradual deceleration, and sudden deceleration accumulated during driving of the electric vehicle,
   wherein the frequency of gradual acceleration, sudden acceleration, gradual deceleration, and sudden deceleration is obtained from pedal input information of the driver collected during previous driving of the electric vehicle, and
   wherein the pedal input information of the driver is information about driver manipulation of the accelerator pedal and driver manipulation of the brake pedal during the previous driving of the electric vehicle.

2. The virtual sound provision method according to claim 1, wherein the virtual driving sound is a virtual engine sound that simulates an engine sound generated from an engine during driving of an internal combustion engine vehicle.

3. The virtual sound provision method according to claim 1, wherein in the step of determining the characteristic of the target sound based on the acceleration and or deceleration driving pattern of the driver, the characteristic of the target sound comprises a sound pressure level (SPL), a frequency band, or a pitch of the target sound.

4. The virtual sound provision method according to claim 1, wherein in the step of controlling the operation of the sound device, a sound generator of the sound device generates a virtual sound signal having the characteristic of the target sound using sound source data according to the sound control signal, an amplifier of the sound device amplifies the generated virtual sound signal, and a speaker of the sound device outputs the amplified virtual sound signal as the virtual driving sound.

5. The virtual sound provision method according to claim 1, wherein when the driver selects a desired vehicle type or a vehicle grade through an interface connected to the sound device in the electric vehicle, the sound device outputs the virtual driving sound adjusted so as to have volume and tone corresponding to the vehicle type or the vehicle grade selected by the driver.

6. The virtual sound provision method according to claim 1, wherein in the step of generating and outputting the sound control signal, the determined characteristic of the target sound is a sound pressure level of the target sound, and the characteristic of the actual driving sound is a real-time sound pressure level acquired from a signal of the actual driving sound detected by the microphone in the electric vehicle.

7. The virtual sound provision method according to claim 6, wherein in the step of generating and outputting the sound control signal, the controller compares the sound pressure level of the target sound with the real-time sound pressure level of the actual driving sound, and generates and outputs a sound control signal such that the real-time sound pressure level of the actual driving sound corresponds to the sound pressure level of the target sound.

8. The virtual sound provision method according to claim 1, wherein the step of determining the characteristic of the target sound further comprises the step of:
   determining, by the controller, the characteristic of the target sound corresponding to the determined acceleration driving pattern or deceleration driving pattern of the driver using a driver emotion model in which the characteristic of the target sound is set based on the accelerator pedal input value and the brake pedal input value of the driver for each of the acceleration driving pattern and the deceleration driving pattern.

9. The virtual sound provision method according to claim 8, wherein the step of determining the acceleration driving pattern of the driver further comprises the steps of:
- determining, by the controller, target torque from the accelerator pedal input value and a current motor torque command increasing at a predetermined torque inclination until reaching the determined target torque, when the driver manipulates an accelerator pedal during driving of the electric vehicle;
- determining, by the controller, whether the driver additionally manipulates the accelerator pedal after an actual torque value, which is the motor torque command, reaches the target torque;
- calculating and storing, by the controller an achievement rate, which is a ratio of a number of times of achievement to a total number of times of manipulation of the accelerator pedal, during one-time driving from key on to key off with one achievement defined as a moment when the driver additionally manipulates the accelerator pedal after the actual torque value has reached the target torque;
- accumulating and averaging, by the controller, the achievement rate calculated whenever one-time driving is performed to calculate an average; and
- determining, by the controller, a step having a range to which the calculated average of the achievement rates belongs as the acceleration driving pattern of the driver.

10. The virtual sound provision method according to claim 8, wherein the step of determining the acceleration driving pattern of the driver further comprises the steps of:
- when the driver manipulates an accelerator pedal during driving of the electric vehicle, determining, by the controller, target torque from the accelerator pedal input value and a current motor torque command increasing at a predetermined torque inclination until reaching the determined target torque;
- determining, by the controller, whether the driver additionally manipulates the accelerator pedal before an actual torque value, which is the motor torque command, reaches the target torque;
- calculating and storing, by the controller, a nonachievement rate, which is a ratio of a number of times of nonachievement to a total number of times of manipulation of the accelerator pedal, during one-time driving from key on to key off with one nonachievement defined as a moment when the driver additionally manipulates the accelerator pedal before the actual torque value has reached the target torque;
- accumulating and averaging, by the controller, the nonachievement rate calculated whenever one-time driving is performed to calculate an average; and
- determining, by the controller, a step having a range to which the calculated average of the nonachievement rates belongs as the acceleration driving pattern of the driver.

11. The virtual sound provision method according to claim 8, wherein the step of determining the acceleration driving pattern of the driver further comprises the steps of:
- determining, by the controller, target acceleration from the accelerator pedal input value and comparing actual acceleration, which is the determined target acceleration, with full acceleration having a predetermined value, when the driver manipulates an accelerator pedal during driving of the electric vehicle;
- calculating and storing, by the controller, an achievement rate, which is a ratio of a number of times of achievement to a total number of times of manipulation of the accelerator pedal, during one-time driving from key on to key off with one achievement defined as a moment when the actual acceleration reaches the full acceleration;
- accumulating and averaging, by the controller, the achievement rate calculated whenever one-time driving is performed to calculate an average as a long-term achievement rate;
- assuming, by the controller, that a case in which the actual acceleration does not reach the full acceleration is nonachievement, calculating a difference value between the full acceleration and the actual acceleration, and determining a period having a range to which the difference value between the full acceleration and the actual acceleration belongs, among a plurality of predetermined periods, as a current manipulation period;
- counting, by the controller, a number of times of each manipulation period determined during one-time driving from key on to key off and calculating and storing an nonachievement rate, which is a ratio of the number of times of each manipulation period to a total number of times of nonachievement, for each manipulation period;
- calculating, by the controller, the nonachievement rate for each manipulation period whenever one-time driving of the electric vehicle is performed and accumulating and averaging the nonachievement rate for each manipulation period to calculate an average as a long-term nonachievement rate; and
- determining, by the controller, the acceleration driving pattern of the driver based on the long-term achievement rate and the long-term nonachievement rate value for each period.

12. The virtual sound provision method according to claim 8, wherein the step of determining the deceleration driving pattern of the driver further comprises the steps of:
- determining, by the controller, target deceleration from the brake pedal input value and comparing actual deceleration, which is the determined target deceleration, with full deceleration having a predetermined value, when the driver manipulates a brake pedal during driving of the electric vehicle;
- assuming, by the controller, that a case in which the actual deceleration reaches the full deceleration is achievement, and calculating and storing an achievement rate, which is a ratio of a number of times of achievement to a total number of times of manipulation of the brake pedal, during one-time driving from key on to key off;
- accumulating and averaging, by the controller, the achievement rate calculated whenever one-time driving is performed to calculate an average as a long-term achievement rate;
- assuming, by the controller, that a case in which the actual deceleration does not reach the full deceleration is nonachievement, calculating a difference value between the full deceleration and the actual deceleration, and determining a period having a range to which the difference value between the full deceleration and the actual deceleration belongs, among a plurality of predetermined periods, as a current manipulation period;
- counting, by the controller, a number of times of each manipulation period determined during one-time driving from key on to key off and calculating and storing an nonachievement rate, which is a ratio of the number of times of each manipulation period to a total number of times of nonachievement, for each manipulation period;

calculating, by the controller, the nonachievement rate for each manipulation period whenever one-time driving of the electric vehicle is performed and accumulating and averaging the nonachievement rate for each manipulation period to calculate an average as a long-term nonachievement rate; and determining, by the controller, the deceleration driving pattern of the driver based on the long-term achievement rate and the long-term nonachievement rate value for each period.

13. A virtual sound provision apparatus for an electric vehicle, the virtual sound provision apparatus comprising:
a driving information detector configured to detect vehicle driving information for outputting a virtual driving sound during driving of the electric vehicle;
a microphone configured to detect an actual driving sound generated from the electric vehicle during driving of the electric vehicle;
a controller configured to determine a characteristic of a target sound based on an acceleration or deceleration driving pattern of a driver from an accelerator pedal input value and a brake pedal input value of the driver, among the electric vehicle driving information detected by the driving information detector, and generating and outputting a sound control signal for outputting the virtual driving sound having the characteristic of the target sound based on the determined characteristic information of the target sound and characteristic information of the actual driving sound detected through the microphone; and
a sound device configured to output a virtual engine sound that simulates an engine sound from the electric vehicle at a time of acceleration and deceleration according to the sound control signal output by the controller,
wherein the controller is configured to:
obtain a frequency of gradual acceleration, sudden acceleration, gradual deceleration, and sudden deceleration from pedal input information of the driver accumulated during driving of the electric vehicle, and
determine the acceleration or deceleration driving pattern of the driver from the frequency of gradual acceleration, sudden acceleration, gradual deceleration, and sudden deceleration accumulated during driving of the electric vehicle,
wherein the pedal input information of the driver is information about driver manipulation of the accelerator pedal and driver manipulation of the brake pedal during previous driving of the electric vehicle.

14. The virtual sound provision apparatus according to claim 13, wherein the virtual driving sound is a virtual engine sound that simulates an engine sound generated from an engine of an internal combustion engine vehicle.

15. The virtual sound provision apparatus according to claim 13, wherein the characteristic of the target sound corresponding to the acceleration or deceleration driving pattern of the driver comprises a sound pressure level (SPL), a frequency band, or a pitch of the target sound.

16. The virtual sound provision apparatus according to claim 13, wherein the sound device comprises:
a sound generator configured to generate a virtual sound signal having the characteristic of the target sound using sound source data according to the sound control signal;
an amplifier configured to amplify the generated virtual sound signal; and
a speaker configured to output the amplified virtual sound signal as the virtual driving sound.

17. The virtual sound provision apparatus according to claim 13, wherein the controller is configured to generate and output a sound control signal for outputting the virtual driving sound having a sound pressure level of the target sound based on the sound pressure level of the target sound, which is the determined characteristic information of the target sound, and a sound pressure level of the actual driving sound, which is the characteristic information of the actual driving sound detected by the microphone.

18. The virtual sound provision apparatus according to claim 17, wherein the controller is configured to compare the sound pressure level of the target sound with the sound pressure level of the actual driving sound and to generate and output a sound control signal for coincidence between the sound pressure level of the actual driving sound and the sound pressure level of the target sound.

19. The virtual sound provision apparatus according to claim 13, wherein the controller is configured:
to determine the characteristic of the target sound corresponding to the determined acceleration driving pattern or deceleration driving pattern of the driver using a driver emotion model in which the characteristic of the target sound is set based on the accelerator pedal input value and the brake pedal input value of the driver for each of the acceleration driving pattern and the deceleration driving pattern.

* * * * *